United States Patent [19]

Yanagihara et al.

[11] Patent Number: 4,457,802
[45] Date of Patent: Jul. 3, 1984

[54] APPARATUS FOR CONVEYING AND SHAPING RUBBER SHEET MATERIALS

[75] Inventors: Toshio Yanagihara, Kobe; Tsunekichi Tominaga, Urawa, both of Japan

[73] Assignee: Kabushiki Kaisha Kobe Seiko Sho, Kobe, Japan

[21] Appl. No.: 433,081

[22] Filed: Oct. 6, 1982

[30] Foreign Application Priority Data

Oct. 6, 1981 [JP] Japan ................. 56-159582

[51] Int. Cl.$^3$ ............................. B29H 17/00
[52] U.S. Cl. ................... 156/405.1; 156/353; 156/362; 156/406.4; 156/446
[58] Field of Search ............... 156/446, 353–355, 156/405.1, 406.4, 406.6, 909, 127.1, 128.6, 133, 362–364

[56] References Cited

U.S. PATENT DOCUMENTS 2,588,207  3/1952  Cleland et al. ............ 156/406.4 X
3,844,871 10/1974  Habert et al. ............ 156/406.4 X
4,398,988  8/1983  Mullender ................ 156/405.1
4,409,872 10/1983  Bertoldo ................. 156/405.1 X Primary Examiner—David A. Simmons
Attorney, Agent, or Firm—Oblon, Fisher, Spivak, McClelland & Maier

[57] ABSTRACT

An apparatus for feeding sheet-like rubber material one after another in the form of cut pieces of a predetermined length and shape to a forming drum from a stock roll of the rubber material, the apparatus including: a first transfer member having a conveying surface on the upper side thereof; a second transfer member having a conveying surface on the underside thereof and disposed in series and lapped relation with the first transfer member with a gap formed therebetween being slightly greater than the thickness of the rubber material; a cutter located across the first transfer member for cutting the rubber material on the conveying surface of the first transfer member along a predetermined cutting line; and a drive mechanism for driving the first and second transfer members in relation with rotation of the forming drum; the lapped portions of the first and second transfer members being arranged to transfer the rubber material along a line conforming with the cutting line; the second transfer member except for the rear lapped portion thereof being rockable toward the forming drum located in front of the fore end of the second transfer member for bringing a transferred cut piece of the rubber material into a position suitable for wrapping the cut piece around the circumference of the drum.

7 Claims, 5 Drawing Figures

APPARATUS FOR CONVEYING AND SHAPING RUBBER SHEET MATERIALS

BACKGROUND OF THE INVENTION

1. Field of the Invention

This invention relates to an apparatus for transferring and shaping rubber sheet material, and more particularly to an apparatus for automatically and accurately applying on a forming drum a sheet-like rubber material like carcass ply and a breaker belt which are generally used as component parts in tire building.

2. Description of the Prior Art

In the tire building process, sheet-like rubber materials such as carcass plies a breaker belt, which are usually stored in the form of rolls on a feeder called a servicer, have thus far been manually applied around a forming drum by an operator, also manually cutting and ending the wrapped sheet material. Namely, the conventional servicer has been used only for the purpose of stocking tire building material, with no function of forcibly feeding the material to the tire building machine, so that it has been the conventional practice to draw out the material by the rotational force of the forming drum, resulting in inaccurate centering of the material. Therefore, the accuracy of the operation of applying a sheet-like rubber material around the forming drum as well as the corresponding productivity largely depended upon the manual skill, suffering from irregularities in the forming accuracy, which have adverse effects on the uniformity of the tires to be ultimately obtained, especially such irregularities that are detrimental in the case of radial tires.

In order to solve the problems of productivity and accuracy, there has been an urgent demand for an automatic tire forming machine which is equipped with an automatic cutter for cutting the feed material into strips of a predetermined length. In order to ensure that a strip of rubber sheet 1, which has been cut into a predetermined length, be fed to a forming drum 2 in an accurately centered state in an automatic tire building servicer, difficulty has been encountered in restricting sideward positional deviations of an acute triangular portion at the tail end of a rubber strip 3 as shown in FIG. 5 in a case where the cutting line forms large angles θ with the a line extending transversely of the rubber strip 3. Namely, since it is difficult to restrict inward deviations by means of rows of conventional guide rollers 4, it is desirable to hold the rubber sheet 3 in a centered position prior to the cutting operation and to feed the rubber sheet of a predetermined length to a shaping drum 2, keeping the centered position. In this connection, there has been proposed a tire building servicer of the type which employs a belt conveyer as means for transferring the material onto the surface of the forming drum, keeping the material on the conveyer completely free of slipping. A typical servicer of this type is shown in FIG. 4. However, they have not yet reached the stage of actual application due to the problems as stated below.

(1) The material which is fed to the forming drum 2 from a stock roll of material 5 is in the form of a series of cut strips 6 of a predetermined length which have to be separated from each other in the course of transfer by a plurality of belt conveyers 7 and 8 and therefore are susceptible to positional deviations as they are freed from the conveyer surface for passage through a bridge 9 across a gap between the two belt conveyers 7 and 8.

(2) Each cut 6 of a predetermined length is separated at the bridge 9 between the belt conveyers 7 and 8. In a case where the cutting line of a breaker belt or the like is disposed at large angles θ with the transverse direction of the material, it becomes necessary to provide a longer bridge between the belt conveyers 7 and 8 to prevent slipping of the transferred material which may occur at the time of separation. In such a case, the feed material is susceptible to positional deviations during the passage through the bridge 9 and to elongation if sticking occurs even to a slightest cut-in portion of the material when severed by a cutter 10.

(3) Prior to wrapping a rubber strip 6 of a predetermined length around the forming drum 2, such has to be passed across a gap for transfer from the belt conveyer 8 to the forming drum 2, so that the rubber strip 6 is likely to deviate again when freed from the transferring surface of the conveyer.

(4) When wrapping the rubber strip around the forming drum 2, the circumferential speed of the drum 2 and the feed speed of the rubber strip 6 by the conveyer 8 have to be in conformity with each other. However, electric control by synchronous motors or the like incurs a problem with regard to the response characteristics at the starting time, and, in a case where the respective drives are synchronized through a mechanical linkage, there arises a need for providing a speed-changing mechanism to cope with variations in the circumferential length of the shaping drum due to use of drums of different sizes. However, commercially available change speed units are unsatisfactory with regard to the rated accuracy and speed, so that there invariably occurs a difference between the circumferential speed of the forming drum and the feeding speed of the cut rubber strip 6, inviting undesirable elongation or wrinkling of the feed material.

SUMMARY OF THE INVENTION

With the foregoing in view, the present invention has as its object the provision of a tire building servicer which is capable of maintaining the positional accuracy of transferred rubber sheet strips of a desired length in both transverse and longitudinal directions thereof until they are wrapped around a forming drum of a tire building machine.

According to the present invention, the above-mentioned object is achieved by an apparatus for feeding sheet-like rubber material one after another in the form of cut pieces of a predetermined length and shape to a forming drum from a stock roll of the rubber material, the apparatus comprising: a first transfer member having a conveying surface on the upper side thereof; a second transfer member having a conveying surface on the underside thereof and disposed in series and lapped relation with the first transfer member with a gap slightly greater than the thickness of the rubber material; a cutter located across the first transfer member for cutting the rubber material on the conveying surface of the first transfer member along a predetermined cutting line; and a drive mechanism for driving the first and second transfer members in relation with rotation of the forming drum; the lapped portions of the first and second transfer members being arranged to transfer the rubber material along a line conforming with the cutting line; and the second transfer member except the rear lapped portion being rockable toward the forming drum located in front of the fore end of the second transfer member for placing a transferrred cut piece of the rubber material into a position suitable for wrapping the same around the circumference of the drum.

The above and other objects, features and advantages of the present invention will become apparent from the following description and the appended claims, taken in conjunction with the accompanying drawings which show by way of example a preferred embodiment of the invention.

DETAILED DESCRIPTION OF THE PREFERRED EMBODIMENT

Figure 1:
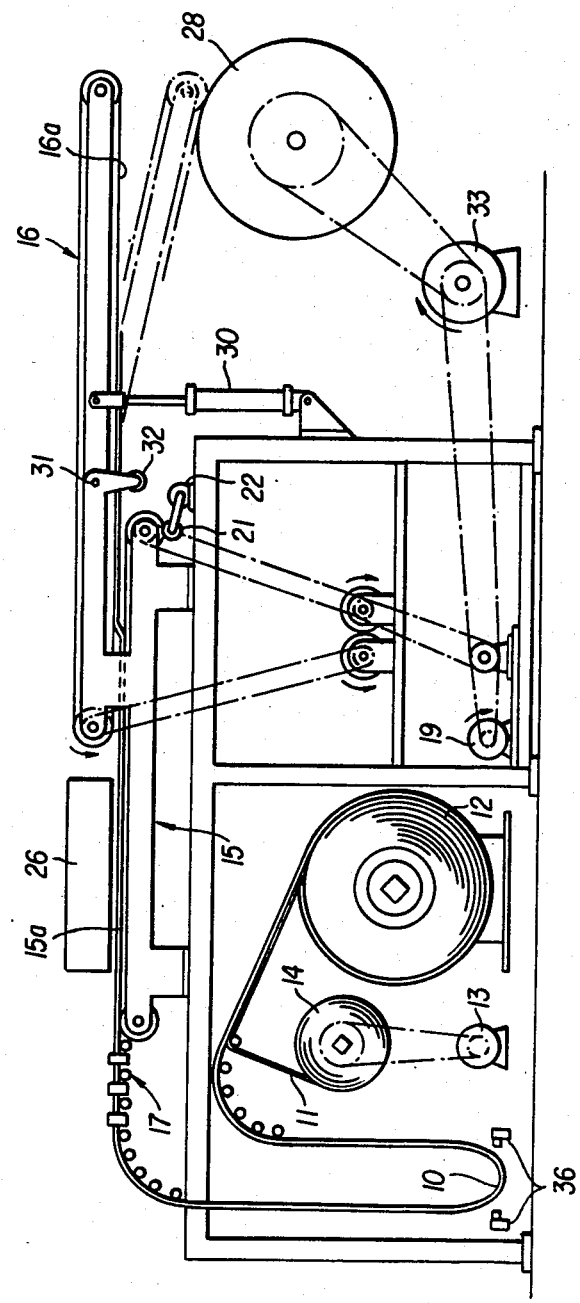
FIG. 1 is a schematic side elevation view of an embodiment of the present invention.

Referring to FIG. 1, there is shown in a schematic side elevation elevational view a tire building servicer according to the present invention, which actually includes in a tandem fashion a pair of servicer mechanisms of the construction as shown in FIG. 1 and in which a forming drum is shifted from one position to another for receiving carcass plies consisting of certain kinds of rubber sheet materials and a breaker ply. Since the mechanisms at the respective positions of the drum are the same, the following description is directed to the mechanism at one position of the drum only.

The rubber sheet material is provided in the form of a stock roll 12 along with a liner 11, and a take-up roll 14 is driven by a motor 13 according to the amount of accumulation of the rubber sheet material 10 in a festoon portion to take up the liner 11 and unwind the rubber sheet material 10 to replenish the amount of stock in the festoon portion. As a detector 36 for the festoon portion, a non-contacting type detector switch such as a photoelectric switch is usually used. The festoon mechanism shown in FIG. 1 is the preferred mechanism.

After forming the festoon portion, the rubber sheet material 10 is sent forward by rear and front conveyers 15 and 16, controlling the position of the rubber sheet material 10 in the transverse direction correctly by a number of guide rollers 17 which are positioned at the terminal end of the festoon portion or at the entrance of the rear conveyer 15. The rear conveyer 15 constitutes a first transfer means which conveys the feed material on its upper side, while the front conveyer 16 serves as a second transfer means which conveys the material on its underside. These conveyers 15 and 16 are provided with sheet retaining means 15a and 16a, respectively, which are in the form of a vacuum cup or a magnet (in the case of a rubber sheet with steel cords) fixed on the conveyer frame on the inner side of the transfer surface the conveyer belt, thereby attracting the rubber sheet material 10 toward the transfer surface of the conveyer belt to prevent sideward positional deviations or elongation in the longitudinal direction.

The rubber sheet 10 which is transferred by a pair of belt conveyers, i.e., the rear conveyer 15 and the front conveyer 16, is retained accurately in a centered position as it is conveyed along the upper side of the rear conveyer 15 and the underside of the front conveyer 16 by the aforementioned sheet retaining means 15a and 16a. The front end of the rear conveyer 15 and the rear end of the front conveyer 16 are lapped with a gap space formed therebetween which is slightly greater than the thickness of the rubber sheet material 10. The sheet retaining means at the lapped portions of the conveyers are arranged such that the rubber sheet material 10 is kept accurately in position by either the sheet retaining means 15a or 16a as the sheet is transferred from the rear conveyer 15 to the front conveyer 16 across the gap space between the lapped portions.

Figure 2:
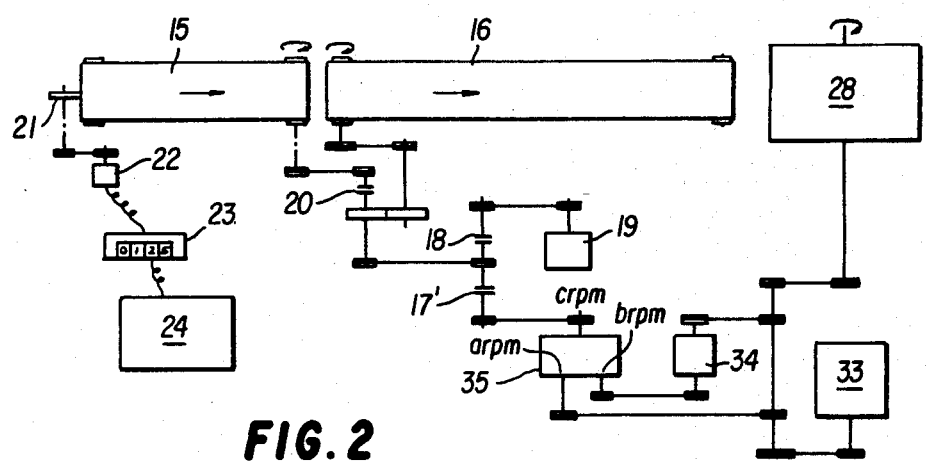
FIG. 2 is a diagrammatic view of a drive system.
Figure 4:
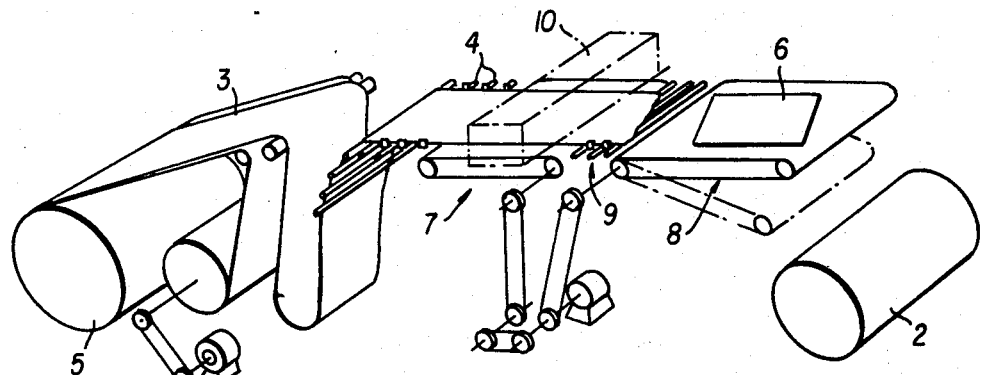
FIG. 4 is a schematic perspective view of a conventional apparatus.
Figure 5:
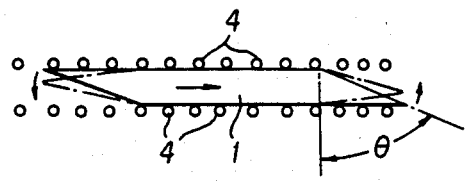
FIG. 5 is a schematic view explanatory of the operation of the conventional apparatus of FIG. 4.

FIG. 2 illustrates a power transmission system for the conveyers 15 and 16, in which a clutch 17' is in a released state and a clutch 18 is in an engaged state in an ordinary transfer operation to drive the two conveyers by a motor 19. The rear conveyer 15 can be stopped independently by releasing the clutch 20. Provided on the lower side of the rear conveyer 15 is a pulse generator 22 connected to a detection roller 21 which is driven by contacting transfer surface of the rear conveyer 15. The feed speed of the rear conveyer 15 is converted into pulses by the pulse generator 22, the output of which is fed to a pulse counter 23 and indicated on a control panel 24 for control purposes.

Figure 3:
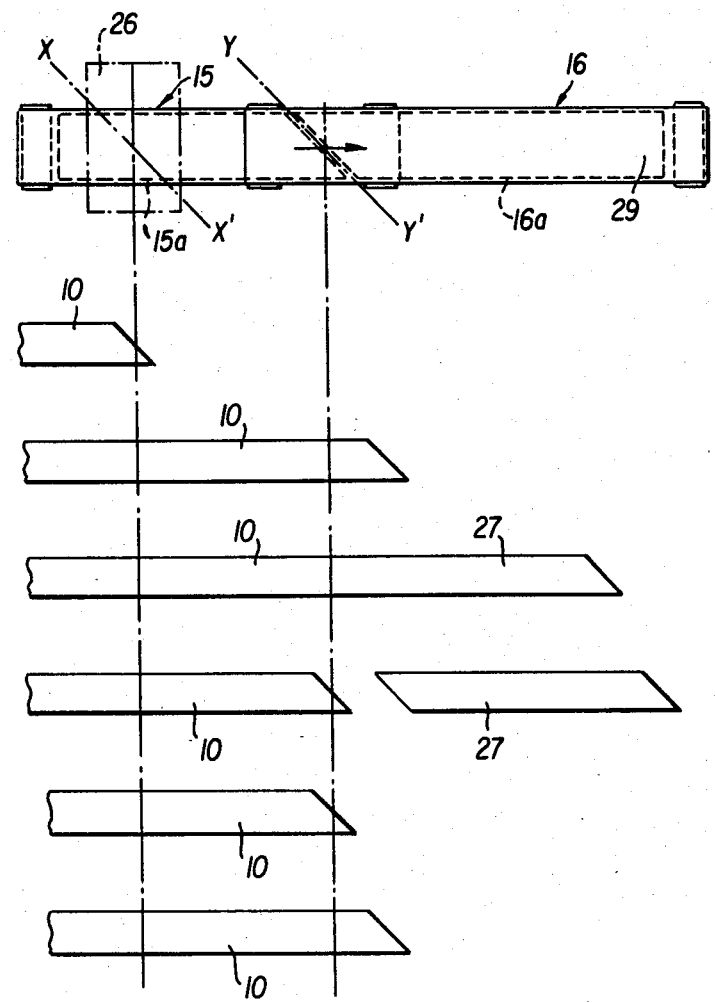
FIG. 3 is a diagrammatic view showing the stages through which a rubber sheet material is shaped during transfer.

Now reference is had to FIG. 3 which shows the successive phases of the shaping operation on the transferred rubber sheet 10. As shown also in FIG. 1, an automatic cutter 26 is located over the rear conveyer 15 to cut the rubber sheet 10 along a predetermined cutting line X—X when the rear conveyer 15 pauses in operation. In a situation where the rubber sheet 10 contains cords, of course such is cut in a direction along the embedded cords. In a preparatory stage of the operation, the head end of the rubber sheet material 10 is aligned with the cutting line X—X' of the cutter 26 and the pulse counter 22 is reset to zero (see FIG. 3(A)). Thereafter, the front and rear conveyers 16 and 15 are simultaneously driven by the motor 19, counting the feed speed by the pulse counter 23. As soon as the pulse counter 23 counts a preset number of pulses corresponding to the circumferential length of the forming drum, the two conveyers 15 and 16 are stopped immediately by a signal from the pulse counter 23 and the rubber sheet material 10 is cut by the cutter 26, resetting the pulse counter 23 again to zero (see FIG. 3(B)). As soon as the two conveyers 15 and 16 are driven again from the motor 19, monitoring of the feed speed thereof is started in the same manner as described above. At the lapped transfer surfaces of the conveyer 15 and 16, the sheet retaining means 15a and 16a which are constituted by a vacuum cup, magnet or the like are positioned such that the leading end of the rubber sheet 10, upon transfer to the front conveyer 16 across the gap of the lapped portions, alignes with a transfer line Y—Y' of the same shape in a horizontal plane as the cutting line X—X', as shown particularly in FIG. 3. As soon as the cut line at the leading end of the transferred material 10 reaches, the transfer line Y—Y' (FIG. 3(C)), the clutch 20 is released in response to a signal from the pulse counter 23 to stop only the rear conveyer 15. Consequently, no tensile force is imposed on any part of the rubber material 10, and a cut piece 27 of a predetermined length is kept accurately in position by the sheet retaining means 15a and 16a of the conveyers 15 and 16 as it is separated from the succeeding rubber sheet portion and sent forward by the front conveyer 16, irrespective of the angles of the touch down position on the front conveyer 16 from the rear conveyer 15, namely, the angles of the cut line relative to a line perpendicular to the length of the sheet material. The cut piece 27 of the rubber material is stopped in a predetermined position by operation of a detection switch or a timer to hold the cut piece 27 in a stand-by position which is optimum for application to a forming drum 28.

Prior to applying the cut piece 27 of the rubber sheet around the forming drum 28, the front conveyer 16, except for a rear lapped portion thereof over the rear conveyer 15, is turned downward about a pivotal support 31 as indicated in phantom lines in FIG. 1 by operation of an air cylinder 30, lowering its transfer surface into contact with the circumferential surface of the forming drum 28 which is internally provided with sheet retaining means such as vacuum cup or magnet similarly to conveyers 15 and 16. In this instance, the lapped portions of the two conveyers 15 and 16 are retained in the same spaced relation by a support roller 32. Simultaneously, the clutch 18 in the drive system of the conveyers 15 and 16 is released and instead the clutch 17' is engaged to transmit the power of the drive motor 33 directly to the front conveyer 16. Under these circumstances, upon rotating the forming drum 28, the front conveyer 16 is also driven in synchronism therewith to feed the cut piece 27 of a predetermined length onto the circumferential surface of the forming drum 28. The feeding speed in this phase of operation is preset to conform with the surface speed of the forming drum 28 by a stepless speed change mechanism 34, so that the supplied cut piece 27 is transferred from the sheet retaining means 16a of the front conveyer 16 to the sheet retaining means of the forming drum 28 directly without causing deformation to the cut piece 27, and applied around the surface of the drum without disturbing the centered position of the cut piece 27. As shown particularly in FIG. 2, the drive system employed in this embodiment is provided with a differential mechanism 35 in addition to the stepless speed change mechanism 34 to transmit a constant component and a variable component of the driving force independently to permit precise control of the feed speed of the rubber sheet material 10 to conform with forming drums of various circumferential lengths. At the time of lapping the cut piece, the forming drum 28 turns more than one revolution, whereupon the lapped tail end of the rubber sheet 27 adheres to the drum surface in registry with its head end.

After lapping the rubber sheet strip 27 around the drum surface, the front conveyer 16 is returned to its initial upper position, and the conveyer drive system is controlled to engage the clutch 18 instead of the clutch 17' and to reengage the clutch 20, so that the front and rear conveyers 16 and 15 are driven from the motor 19 to again feed predetermined length of the rubber sheet material 10 a predetermined length. Feeding of the rubber sheet material, is recommenced as illustrated in FIG. 3(E), along with of course the pulse counting which has been stopped since the stage of FIG. 3(C). As soon as the pulse counter 23 arrives at a count equivalent to the circumferential length of the forming drum 28, the two conveyers 15 and 16 are stopped (FIG. 3(F)), and the rubber sheet material 10 is cut along the cutting line X—X'. This phase of operation is the same as in FIG. 3(B), and thereafter the same cycle of operation is repeated.

With regard to the differential mechanism 35 which is employed in the above-described drive system, such is constituted by three shafts with rotational speeds of a, b, and c, respectively, which are in the relationship expressed by the equation $$K_1 a + K_2 b = K_3 c$$

(in which $K_1$, $K_2$ and $K_3$ are constants). Since a differential planetary gear system is well known in the art, description of the construction of the differential mechanism 35 itself is omitted here. If the above-mentioned formula is applied to the drive system of the foregoing embodiment, the constant input a, the variable input b, and the output c to the conveyers (see FIG. 2) are expressed as $$c = \frac{K_1}{K_3} a + \frac{K_2}{K_3} b$$

If the stepless speed change unit 34 contains irregularities of $+ab$ in accuracy, the irregularity ab in the output is $$ac = \left[ \frac{K_1}{K_3} a + \frac{K_2}{K_3} (b \pm ab) \right] - \left[ \frac{K_1}{K_3} a + \frac{K_2}{K_3} \right]$$

$$= \pm \frac{K_2}{K_3} ab$$

Therefore, the accuracy of the stepless speed change unit 34 can be enhanced by holding the value of $K_2/K_3$ to a minimum.

Actually, the carcass ply or breaker ply of the tire is formed of more than two kinds of rubber sheet material, but tires with any number of plies can be produced by juxtaposing a suitable number of the above-described feeder and shifting the position of a forming drum sequentially to wrap around different kinds of rubber sheet materials.

It will be appreciated from the foregoing description that, according to the present invention, a first transfer member with a conveying surface on its upper side and a second transfer member with a conveying surface on its underside have respective opposing ends lapped with a clearance slightly greater than the thickness of a rubber sheet material to be transferred, so that the rubber sheet is always securely held by either one of the transfer members, accurately keeping a predetermined shape and position. As the cutter is located in the vicinity of the first transfer member which has its transfer surface on the upper side, the rubber sheet is securely held on the first transfer member when cut by the cutter. Further, the lapped portions of the transfer members, where the rubber sheet material is handed over from the first transfer member to the second transfer member, are arranged in a shape which corresponds in a horizontal plane to the shape of the cutting line of the rubber sheet, and the first transfer member alone is stopped as soon as the leading end of a cut piece of the transferred rubber sheet reaches the transfer portion of the transfer members, so that the cut piece can be separated along the cutting line without causing positional deviation or elongation thereto. In addition, the second transfer member which has a conveying surface on its underside is rockable except for a rear lapped portion at the time of wrapping the cut piece of the rubber sheet around the circumference of a forming drum, and thus it is capable of feeding and wrapping the cut piece around the forming drum automatically and accurately, keeping the correct position and shape of the rubber sheet material. In this instance, the accuracy of the wrapping operation can be further enhanced by synchronizing the feeding speed of the second transfer member with the circumferential speed of the forming drum as in the above-described preferred embodiment. Moreover, the feeding speed of the rubber sheet material can be controlled with a high degree of accuracy to conform with forming drums of various circumferential lengths by perfectly synchronizing the transfer member and forming drum through an interlinked mechanical drive incorporating a stepless speed change mechanism and a differential mechanism in such a manner as to transmit the constant and variable components of the driving force separately.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for feeding a sheetlike rubber material one after another in the form of cut pieces of a predetermined length and shape to at least one forming drum from a stock roll of said rubber material, said apparatus comprising:

a first transfer member having a conveying surface on an upper side thereof;

a second transfer member having a conveying surface on an underside thereof and which is disposed in series and lapped relation with said first transfer member so as to form a gap therebetween slightly greater than a thickness of said rubber material and wherein said forming drum is located in front of a fore end portion of said second transfer mechanism;

a drive system for driving said first and second transfer members in relation to rotation of said forming drum;

a cutter located across said first transfer member for cutting a piece of said rubber material on the conveying surface of said first transfer member along a predetermined cutting line;

said lapped portions of said first and second transfer members being positioned so as to transfer said cut piece along a line conforming with said cutting line; and means for rocking said second transfer member except for said lapped portion toward said forming drum for bringing a transferred cut piece of said rubber sheet into a position suitable for wrapping said cut piece around a circumference of said drum.

2. The apparatus as set forth in claim 1, wherein said first and second transfer members further comprise sheet retaining means for holding said sheet-like rubber material accurately in position on said respective conveying surfaces of said first and second transfer members.

3. The apparatus as set forth in claim 1, wherein said first and second transfer members further comprise belt conveyors.

4. The apparatus as set forth in claims 2 or 3, wherein said sheet retaining means further comprises a vacuum cup.

5. The apparatus as set forth in claims 2 or 3, wherein said sheet retaining means further comprises a magnet.

6. The apparatus as set forth in claim 1, wherein said drive system further comprises an electric motor, a pulse generator operatively associated with said first transfer member for detecting a feeding speed thereof and having an output terminal, pulse counter means connected to said output terminal of said pulse generator for producing an output signal upon reaching a preset count, and clutch means for stopping said first transfer means in response to said output signal of said pulse counter means.

7. The apparatus as set forth in claim 1, wherein said at least one forming drum further comprises a plurality of forming drums of various sizes and said drive system further comprises a stepless speed change mechanism and a differential mechanism for transmitting constant and variable components of driving force so as to drive said first and second transfer members in synchronism with circumferential speeds of said forming drums of various sizes.

* * * * *